(12) United States Patent
Seok et al.

(10) Patent No.: US 10,915,199 B2
(45) Date of Patent: Feb. 9, 2021

(54) INPUT DEVICE AND CONTROL METHOD OF THE SAME

(71) Applicants: HYUNDAI MOTOR COMPANY, Seoul (KR); KIA MOTORS CORPORATION, Seoul (KR)

(72) Inventors: Donghee Seok, Suwon-si (KR); Gideok Kwon, Seoul (KR); Jong Bok Lee, Suwon-si (KR); HeeJin Ro, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/830,636

(22) Filed: Dec. 4, 2017

(65) Prior Publication Data
US 2019/0095029 A1  Mar. 28, 2019

(30) Foreign Application Priority Data

Sep. 27, 2017 (KR) .......................... 10-2017-0125148

(51) Int. Cl.
| | |
|---|---|
| *G06F 3/041* | (2006.01) |
| *G06F 3/044* | (2006.01) |
| *B60K 37/06* | (2006.01) |
| *G06F 3/01* | (2006.01) |

(52) U.S. Cl.
CPC ............ *G06F 3/0416* (2013.01); *B60K 37/06* (2013.01); *G06F 3/017* (2013.01); *G06F 3/044* (2013.01); *B60K 2370/1438* (2019.05); *B60K 2370/1464* (2019.05); *G06F 2203/04101* (2013.01)

(58) Field of Classification Search
CPC .............. H03K 17/955; H03K 17/962; H03K 17/9622; G06F 13/42; G06F 3/017; G06F 3/0416; G06F 3/044; G06F 2203/04101; G02B 27/01; G01R 27/2605; B60K 37/06; B60K 2370/1438; B60K 2370/1464
See application file for complete search history.

(56) References Cited

U.S. PATENT DOCUMENTS

| | | | |
|---|---|---|---|
| 8,564,314 B2 | 10/2013 | Shaikh et al. | |
| 2004/0189100 A1* | 9/2004 | Gasperi | ................ H03K 17/955 |
| | | | 307/125 |

(Continued)

FOREIGN PATENT DOCUMENTS

| | | |
|---|---|---|
| JP | 2011007528 A | 1/2011 |
| JP | 2012150747 A | 8/2012 |

(Continued)

*Primary Examiner* — Richard J Hong
(74) *Attorney, Agent, or Firm* — Brinks Gilson & Lione (57) ABSTRACT

The present disclosure relates to an input device for vehicle and control method of the same, and more particularly, to an input device for vehicle implemented as a plurality of sensor electrodes and control method of the input device. The input device may include: first sensor electrodes arranged in a first preset channel area with a first preset density; second sensor electrodes arranged in a second preset channel area with a second preset density, the second density being less than the first density; and a controller configured to determine a capacitive reference value of the input device based on first sensor value information that is collected from the first sensor electrodes and the second sensor electrodes.

4 Claims, 11 Drawing Sheets

(56) References Cited

U.S. PATENT DOCUMENTS

| | | | |
|---|---|---|---|
| 2011/0134054 A1* | 6/2011 | Woo | H03K 17/962 |
| | | | 345/173 |
| 2012/0037485 A1* | 2/2012 | Sitarski | H03K 17/955 |
| | | | 200/600 |
| 2013/0033356 A1* | 2/2013 | Sitarski | G06F 13/42 |
| | | | 340/1.1 |
| 2013/0221993 A1 | 8/2013 | Ksondzyk et al. | |
| 2013/0321065 A1* | 12/2013 | Salter | H03K 17/9622 |
| | | | 327/517 |
| 2014/0002405 A1* | 1/2014 | Salter | H03K 17/962 |
| | | | 345/174 |
| 2014/0062946 A1* | 3/2014 | Graumann | G02B 27/01 |
| | | | 345/174 |
| 2014/0145733 A1* | 5/2014 | Buttolo | G01R 27/2605 |
| | | | 324/679 |
| 2016/0092028 A1 | 3/2016 | Vallis et al. | |
| 2016/0112044 A1 | 4/2016 | Salter et al. | |
| 2020/0036381 A1* | 1/2020 | Tomar | G06F 3/017 |

FOREIGN PATENT DOCUMENTS

| | | |
|---|---|---|
| JP | 2013190850 A | 9/2013 |
| KR | 10-2016-0051545 | 5/2016 |

* cited by examiner

INPUT DEVICE AND CONTROL METHOD OF THE SAME

CROSS-REFERENCE TO RELATED APPLICATION

The present application claims priority to and the benefit of Korean Patent Application No. 10-2017-0125148, filed on Sep. 27, 2017, which is incorporated herein by reference in its entirety.

FIELD

The present disclosure relates to an input device for vehicle and control method of the same, and more particularly, to an input device for vehicle implemented as a plurality of sensor electrodes and control method of the input device.

BACKGROUND

The statements in this section merely provide background information related to the present disclosure and may not constitute prior art.

A capacitive proximity sensor technology relates to detecting a change in capacitance of a proximity sensor by an approaching object and determining whether the object is approaching by comparing the detected capacitance and a reference value. This technology may calibrate the reference value based on surrounding conditions such as temperature and humidity, thereby providing optimal performance.

In the proximity sensor technology, however, the proximity sensor may experience poor sensitivity due to surrounding noise. For example, when a smart phone lying on the driver's lap or a console area of the vehicle happen to locate within a detection area of the proximity sensor, the proximity sensor may be inadvertently active. Many studies are in progress these days to enhance the sensitivity of the proximity sensor.

SUMMARY

An aspect of the present disclosure is to provide an input device and control method of the same that may filter out surrounding noise in setting a capacitive reference value of the input device by reflecting a sensor channel density as a design element in designing the input device.

Another aspect of the present disclosure is to provide an input device and control method of the same which may design any one of detection areas of the input device with a high possibility of wrong recognition to have a high sensor channel density and may calculate a reference value of the input device based on a sensor value excluding the sensor value determined as noise.

In one form of the present disclosure, an input device may include first sensor electrodes arranged with a first preset density in a first preset channel area; second sensor electrodes arranged with a second preset density in a second preset channel area, the second density being less than the first density; and a controller configured to determine a capacitive reference value of the input device based on first sensor value information that is collected from the first sensor electrodes and the second sensor electrodes.

The first preset channel area may include a plurality of first sensor electrodes, and the controller may be configured to determine the capacitive reference value of the input device based on second sensor value information that is collected from active first sensor electrodes of the plurality of first sensor electrodes and from the second sensor electrodes.

The controller may be configured to change a subset of first sensor electrodes of the plurality of first sensor electrodes to inactive first sensor electrodes of the plurality of first sensor electrodes, wherein the subset of first sensor electrodes of the plurality of first sensor electrodes contain noise information.

The controller may be configured to determine a subset of first sensor electrodes of the plurality of first sensor electrodes as sensor electrodes containing the noise information, wherein the subset of first sensor electrodes of the plurality of first sensor electrodes output a sensor value beyond a predetermined range.

The controller may be configured to change the inactive first sensor electrodes of the plurality of first sensor electrodes into the active first sensor electrodes of the plurality of first sensor electrodes when a sensor value of the inactive first sensor electrode of the plurality of first sensor electrodes is detected within the predetermined range.

The second sensor electrode may be the sensor electrodes.

The input device may have at least the first preset channel area that is formed in the input device.

The input device may be installed on a center fascia of a vehicle.

In accordance with another aspect of the present disclosure, a control method of an input device, the control method may include collecting a first sensor value from first sensor electrodes; collecting a second sensor value from second sensor electrodes; and determining a capacitive reference value of the input device based on first sensor value information collected from the first sensor electrodes and the second sensor electrodes, wherein the first sensor electrodes are arranged in a first preset channel area with a first preset density, and wherein the second sensor electrodes are arranged in a second preset channel area with a second preset density and the second preset density is less than the first preset density.

A plurality of the second preset channel area may include a plurality of first sensor electrodes, and wherein determining the capacitive reference value of the input device based on the first sensor value information includes determining the capacitive reference value of the input device based on the second sensor value information collected from active first sensor electrodes of a plurality of first sensor electrodes and from the second sensor electrodes, wherein a plurality of the second preset chancel area includes the plurality of first sensor electrodes.

Changing a subset of first sensor electrodes of the plurality of first sensor electrodes to inactive first sensor electrodes of the plurality of first sensor electrodes, wherein the subset of first sensor electrodes of the plurality of first sensor electrodes contain noise information.

The control method may further include determining a subset of first sensor electrodes of the plurality of first sensor electrodes as sensor electrodes containing the noise information, wherein the subset of first sensor electrodes of the plurality of first sensor electrodes output a sensor value beyond a predetermined range.

The control method may further include changing the inactive first sensor electrodes of the plurality of first sensor electrodes to the active first sensor electrodes of the plurality of first sensor electrodes when a sensor value of the inactive first sensor electrodes of the plurality of a first sensor electrodes is detected within the predetermined range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of forms of the present disclosure will be described, and description of what are commonly known in the art or what overlap each other in the forms will be omitted. The terms as used throughout the specification, such as "~part", "~unit", "~module", "~member", "~block", etc., may be implemented in software and/or hardware, and a plurality of "~parts", "~units", "~modules", "~members", or "~blocks" may be implemented in a single element, or a single "~part", "~unit", "~module", "~member", or "~block" may include a plurality of elements.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and forms of the present disclosure will now be described with reference to accompanying drawings.

Figure 1:
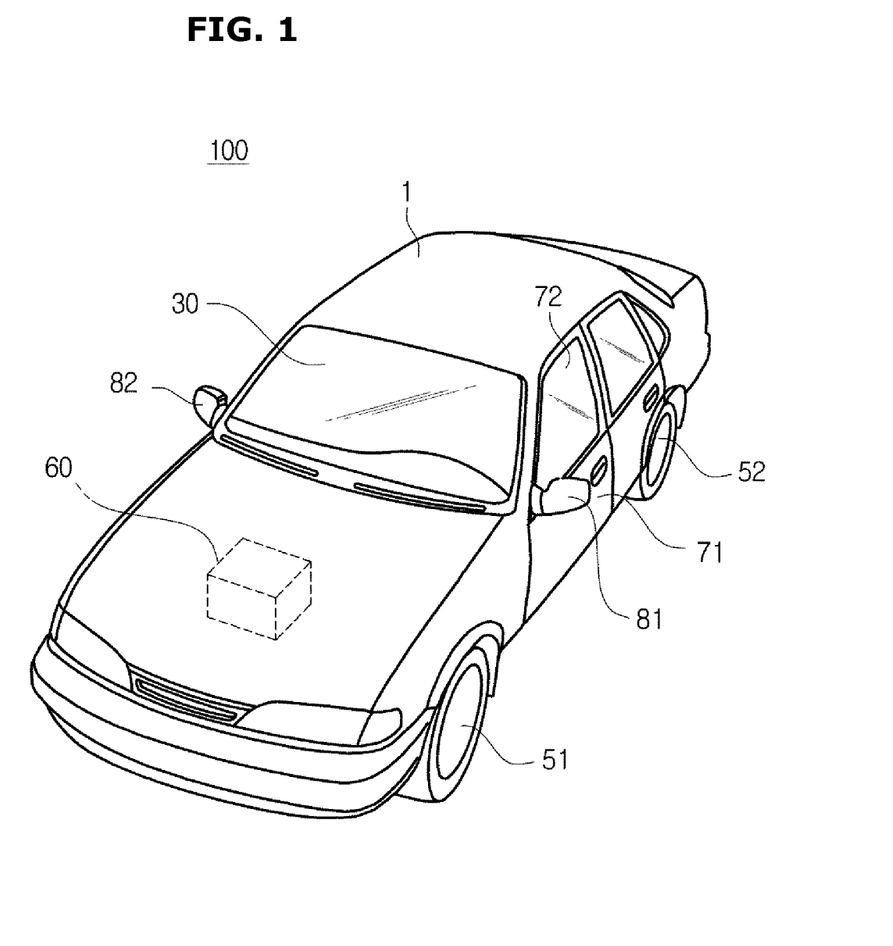
FIG. 1 shows the exterior of a vehicle.

FIG. 1 shows the exterior of a vehicle 100, in some forms of the present disclosure.

Referring to FIG. 1, the vehicle 100 may include a main body 1 that constitutes the exterior of the vehicle 100, a front glass 30 that allows the driver inside the vehicle 100 to look ahead of the vehicle 100, wheels 51, 52 for moving the vehicle 100, a driving system 60 for turning the wheels 51, 52, doors 71 that shield the inside of the vehicle 100 from outside, and side mirrors 81, 82 that help the driver see areas behind and to the sides of the vehicle 100.

The front glass 30, also termed as a windshield glass, is placed on the top front of the main body 100 for the driver inside the vehicle 100 to obtain visual information about things in front of the vehicle 100.

The wheels 51 and 52 include front wheels 51 and rear wheels 52, and the driving system 60 may provide turning forces to the front wheels 51 or rear wheels 52 to move the vehicle 100 forward or backward. The driving system 60 may employ a motor that produces the turning force from electrical power supplied from a storage battery (not shown) or a combustion engine (not shown) that burns a fuel to create the turning force.

The doors 71 may be pivotally attached onto the left and right sides of the main body 1, and opened for the driver and passenger to get on or get off the vehicle 100 and closed for shielding the inside of the vehicle 100 from outside. The doors 71 may have windows 72 installed thereon for the driver and passenger to look in or out through the windows 72. In some forms of the present disclosure, the windows 72 may be installed to have only one viewable side and be opened and closed.

The side mirrors 81 and 82 include a left side mirror 81 and a right side mirror 82 placed on the left and right sides of the main body 1, respectively, for helping the driver obtain views behind and to the side of the vehicle 100.

Figure 2:
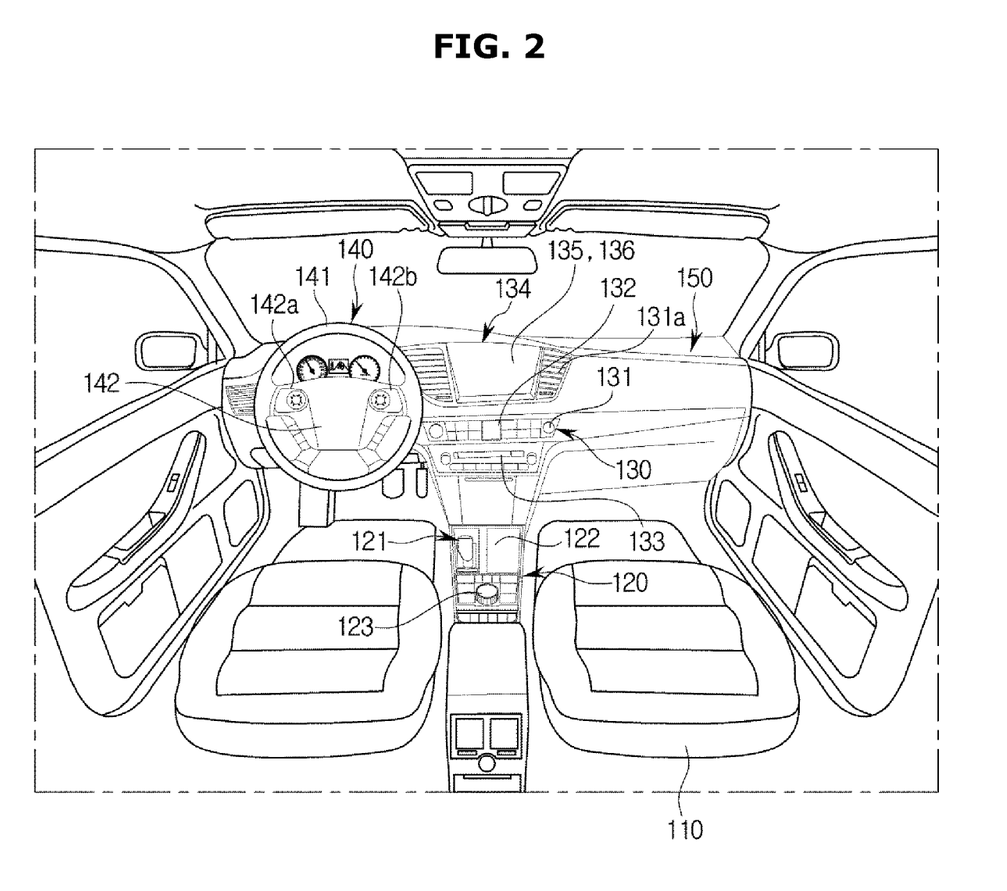
FIG. 2 shows the interior of a vehicle.

FIG. 2 shows an interior of the vehicle 100, in some forms of the present disclosure. Referring to FIG. 2, the vehicle 100 may include seats 110 reserved for driver and passengers to sit on, a gear box 120, a center fascia 130 and a dashboard 150 having a steering wheel 140.

In the gear box 120, a gearshift 121 for shifting gears of the vehicle 100, and a touch pad 122 for controlling functions of the vehicle 100 may be installed. A dial adjuster 123 may be optionally installed as needed.

In the center fascia 130, an air conditioner 131, a clock 132, an audio system 133, and an Audio, Video, and Navigation (AVN) system 134 may be installed.

The air conditioner 131 keeps the atmosphere inside the vehicle 100 pleasant by controlling temperature, humidity, air cleanness, and air flows inside the vehicle 100. The air conditioner 131 may include at least one vent 131*a* installed in the center fascia 130 for venting air. There may also be buttons or dials installed in the center fascia 130 to control e.g., the air conditioner 131. The driver or the user may control the air conditioner 131 with the buttons arranged on the center fascia 130.

The clock 132 may be arranged around the buttons or dials for controlling the air conditioner 131.

The audio system 133 may include a control panel on which a number of buttons are mounted to perform functionality of the audio system 133. The audio system 133 may provide a radio mode for radio listening and a media mode for reproducing audio files stored in various storage media.

The AVN system 134 may be embedded in the center fascia 130 of the vehicle 100. The AVN system 134 is a system for comprehensively performing audio, video and navigation functions of the vehicle 100 according to the user's manipulation. The AVN system 134 may include an input unit 135 for entering user commands regarding the AVN system 134, and a display 136 for displaying a screen related to audio play, video play, or navigation.

There may be an input device 200 installed on the center fascia 130 to recognize an approaching gesture of the user. The input device 200 as herein used includes a proximity sensor module for recognizing an approaching gesture of the user based on a change in capacitance due to the gesture of the user.

Figure 3:
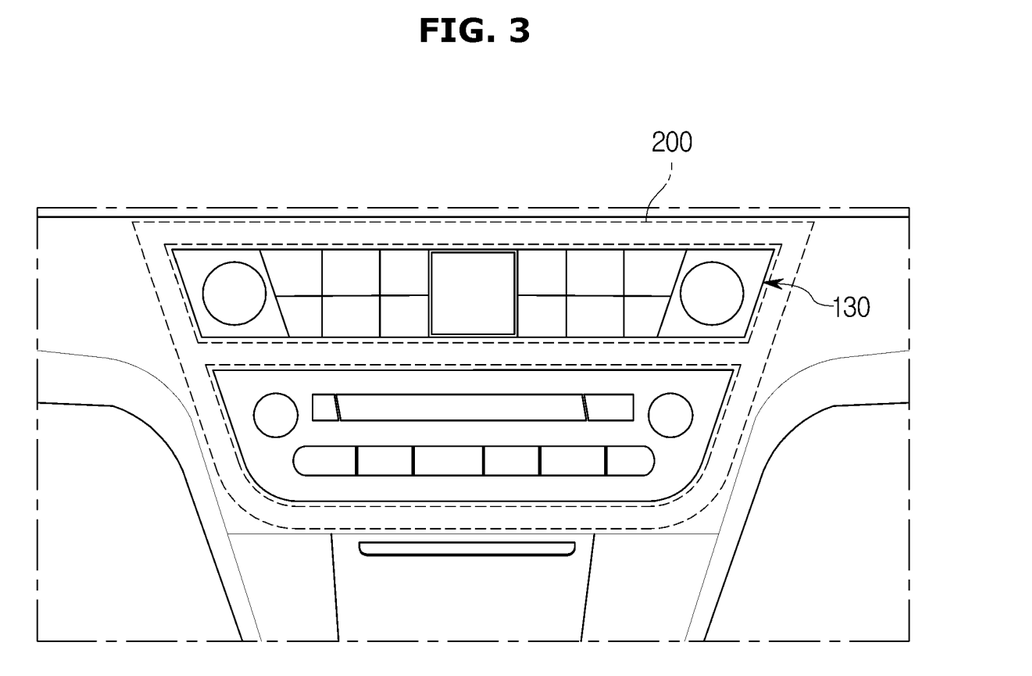
FIG. 3 shows an input device installed on a center fascia.

FIG. 3 shows the input device 200 installed on the center fascia 130, in some forms of the present disclosure.

Referring to FIG. 3, the input device 200 may be installed on the edge of the rear side of the panel of the center fascia 130 along the shape of arrangement of buttons on the panel of the center fascia 130 to facilitate collection of gesture information of the user.

Although gesture detection areas of the input device 200 are formed around the air conditioner 131, the clock 132, and the audio system 133 in FIG. 3, how to install the input device 200 is not limited to what is shown in FIG. 3. For example, the input device 200 may be formed along the shape of arrangement of the display 136 of the AVN system 134 and the vent 131*a* of the air conditioner 131, and may be designed in various ways according to the designer's intention.

The input device 200 may receive control commands for various devices installed in the vehicle 100 based on approaching gestures of the user which are made within the detection area. However, a device like a smart phone lying on the driver's lap, on a person's lap seated in the passenger seat, or in an holder of the console would make noise in the detection area of the input device 200 depending on the position where the input device 200 is fixed, and the noise would lead to wrong operation of the input device 200.

The noise as herein used is an external stimulus occurring in the detection area of the input device 200 except a gesture of the user, and may be defined as having all kinds of external stimuli that would lead to wrong operation of the input device 200 regardless of the user's intention.

The present disclosure is directed to the input device 200 and control method of the same, by which the noise may be filtered out by arrangement and control of sensor electrodes.

The steering wheel 140 is a device to control a traveling direction of the vehicle 100, including a rim 141 to be held by the driver and a spoke 142 connected to a steering system of the vehicle 100 for connecting the rim 141 to a hub of a rotation shaft for steering. In some forms of the present disclosure, control devices 142*a*, 142*b* may be formed on the spoke 142 to control various devices in the vehicle 100, e.g., the audio system.

In some forms of the present disclosure, the dashboard 150 may further include various instrument panels to indicate traveling speeds of the vehicle 100, engine rpm, a remaining amount of fuel or the like, and a glove box for containing things.

Some forms of the input device 200 will now be described in detail with reference to accompanying drawings.

The input device 200 has a plurality of sensor electrodes installed in any of the detection areas of the input device 200 where noise is likely to occur. In other words, a plurality of sensor electrodes are installed in any of the detection areas of the input device 200 where noise is likely to occur, and if the noise occurs, a sensor electrode that detects the noise is inactive to improve precision of setting a capacitive reference value of the input device 200.

To help understanding, a concept of the "noise area" and grounds for setting the noise area will be first examined, and the principle of filtering the noise based on the arrangement of the sensor electrodes equipped in the input device 200 will then be examined.

The input device 200 may have an area where noise is likely to occur, which may be differently set up depending on an installation condition of the input device 200. Specifically, under a limited environmental condition, the noise that is likely to occur in the condition may be expected, and consequently, an area where the noise is likely to occur around the input device 200 may be expected. In the following description, a noise area is defined as any of the detection areas of the input device 200 where noise is likely to occur.

Figure 4:
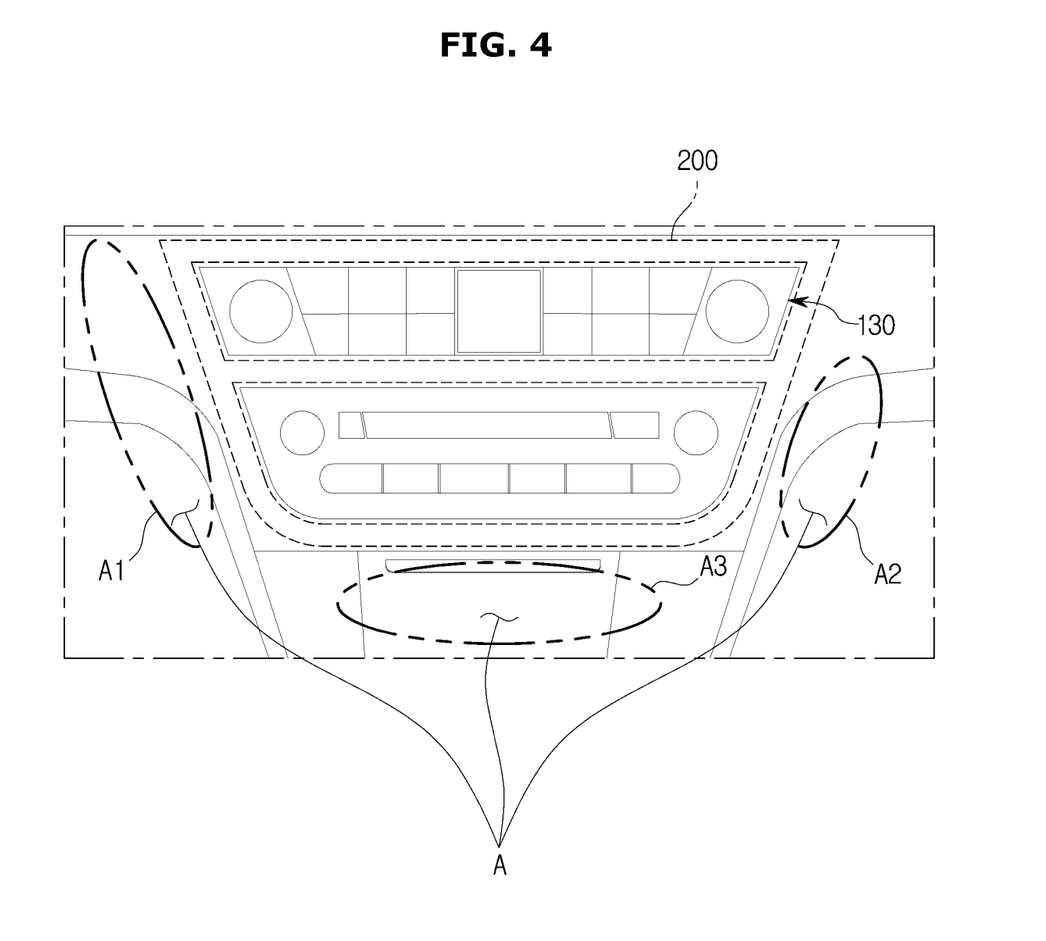
FIG. 4 shows an example of setting up noise areas of the input device shown in FIG. 3.

FIG. 4 shows an example of setting up noise areas A of the input device 200 shown in FIG. 3. Referring to FIG. 4, the input device 200 in some forms of the present disclosure may be installed around the center fascia 130 of the vehicle 100, and more particularly, installed on the edge of the center fascia 130 along the shape of the center fascia 130. In this case, the noise area A of the input device 200 may be set up around the both sides and around the lower center portion of the input device 200.

The noise area A of the input device 200 as shown in FIG. 4 is set up based on the following grounds.

First, in a case that the input device 200 is installed on the center fascia 130, the noise occurring on both sides to the center fascia 130 with respect to the front of the center fascia 130 due to the lap of the driver and the lap of a person seated in the passenger seat may be recognized as an approaching gesture of the user, and the nose may lead to setting a wrong capacitive reference value of the input device 200. In addition, the noise occurring in the lower center portion of the input device 200 due to an electronic device such as a smart phone placed in a holder of the console may be recognized as an approaching gesture of the user, and the noise may lead to setting a wrong capacitive reference value of the input device 200.

In some forms of the present disclosure, the input device 200 has the noise area A set up to have the both side areas A1, A2 and the lower center area A3 of the input device 200 to deal with the noise that is likely to occur in the aforementioned situations.

In FIG. 4, examples of the noise area A that may be set up in the case that the input device 200 is installed on the center fascia 130 of the vehicle 100 are shown, but how to set up the noise area A is not limited to what is described above in connection with FIG. 4. In other words, the input device 200 according to the present disclosure may have the noise area A, which is one of the areas A1 to A3 or a newly setup area other than the areas A1 to A3, or alternatively, may have two or four or more noise areas A in some forms of the present disclosure.

The input device 200 may have the plurality of sensor electrodes arranged in the noise area set up based on the aforementioned grounds to minimize a calculation error in the process of calculating the capacitive reference value for the sensor electrodes of the input device 200.

A principle of filtration of the noise and calculation of the capacitive reference value through an arrangement of the sensor electrodes equipped in the input device 200 will now be described in connection with the accompanying drawings.

Figure 5:
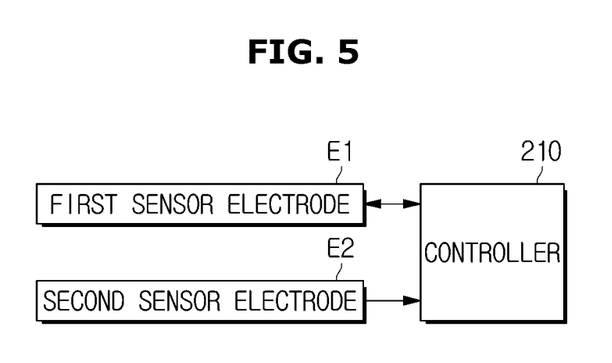
FIG. 5 is a control block diagram of an input device.
Figure 6:
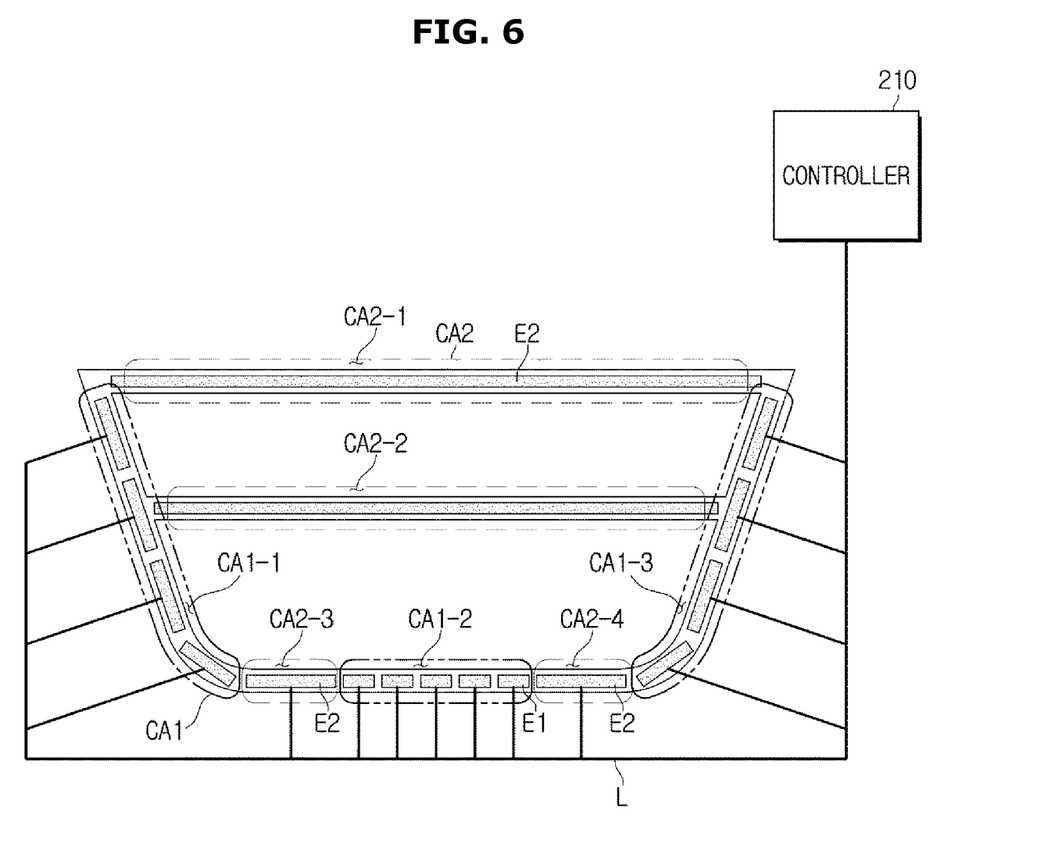
FIG. 6 shows arrangement of sensor electrodes of an input device.

FIG. 5 is a control block diagram of the input device 200, in some forms of the present disclosure, and FIG. 6 shows an arrangement of sensor electrodes of the input device 200, in some forms of the present disclosure.

Referring to FIGS. 5 and 6, in some forms of the present disclosure, the input device 200 may include first sensor electrodes E1 arranged with a first preset density in a first preset channel area CA1, second sensor electrodes E2 arranged with a second preset density in a second preset channel area CA2, the second density being less than the first density, and a controller 210 for determining a capacitive reference value of the input device 200 based on sensor value information collected from the first and second sensor electrodes E1, E2.

The first channel area CA1 is defined to be an area where the sensor electrodes E1 are arranged for the noise area in the detection area of the input device 200, and the second channel area CA2 is defined to be an area where the sensor electrodes E2 are arranged for an area other than the noise area. Furthermore, a sensor electrode and a link L connecting the sensor electrode and the controller 210 are collectively defined as a channel.

The first sensor electrodes E1 collect gesture information from the user at predetermined intervals and output collected sensor value information to the controller 210. The first sensor electrodes E1 may form the first channel area CA1 by being arranged with the first preset density.

The first channel area CA1 is a channel area expected to collect noise information and formed by the plurality of first sensor electrodes E1 arranged with the first preset density. The input device 200 in accordance with the present disclosure may efficiently filter out the noise and minimize a channel loss by arranging the first sensor electrodes E1 at high density in the first channel area CA1.

Referring to FIG. 6, the input device 200 in some forms of the present disclosure may form a plurality of first channel areas CA1. In FIG. 6, an example of setting up the first channel area CA1 on both sides and a lower center portion of the input device 200 is shown, and for convenience of explanation, the respective channel areas are denoted 1-1 channel area CA1-1, 1-2 channel area CA1-2, and 1-3 channel area CA1-3.

The second sensor electrodes E2 collect gesture information from the user at predetermined intervals and output collected sensor value information to the controller 210. The second sensor electrodes E2 may form the second channel area CA2 by being arranged with the second preset density which is less than the first density.

The second channel area CA2 is an area set up to collect an approaching gesture of the user in an area where noise is less likely to occur, and is formed by at least one second sensor electrode E2 arranged at the second density. The input device 200 in accordance with the present disclosure may increase the processing speed of the input device 200 by arranging the second sensor electrodes E2 at low density in the second channel area CA2 to minimize the number of entire channels.

Referring to FIG. 6, the input device 200 in some forms of the present disclosure may form the second channel area CA2 in between the plurality of first channel areas CA1, i.e., CA1-1, CA1-2, and CA1-3. The second channel areas CA2 formed in between the 1-1, 1-2, and 1-3 channel areas are denoted 2-1, 2-2, 2-3, and 2-4 channel areas CA2-1, CA2-2, CA2-3, and CA2-4.

A plurality of second sensor electrodes may be arranged in each of the 2-1, 2-2, 2-3, and 2-4 channel areas CA2-1, CA2-2, CA2-3, and CA2-4, and alternatively, one of the second sensor electrodes may be arranged in each of the second channel areas in some forms of the present disclosure. For example, if a plurality of second sensor electrodes are arranged in a single second channel area, e.g., in the 2-1 channel area CA2-1, the second sensor electrodes may be interconnected to serve as a single sensor electrode. In another example, if one of the second sensor electrodes is arranged in each of the 2-1, 2-2, 2-3, and 2-4 channel areas CA2-1, CA2-2, CA2-3, and CA2-4, the second sensor electrodes arranged in the channel areas may be interconnected to serve as a single sensor electrode.

For a purpose of reducing the number of the entire channels, the second sensor electrodes E2 to be arranged in the second channel area CA2 may vary in design within a range that may be easily considered by an ordinary skilled person in the art. In the following description, for convenience of explanation, some forms of the present disclosure will be described based on the occasion when the second sensor electrodes E2 arranged in the second channel areas CA2 are interconnected to serve as a single sensor electrode.

The controller 210 may be implemented with a memory (not shown) for storing an algorithm to control operation of the components of the input device 200 or data about a program that implements the algorithm, and a processor (not shown) for carrying out the aforementioned operation using the data stored in the memory. The memory and the processor may be implemented in separate chips, or in a single chip.

The controller 210 may determine the capacitive reference value of the input device 200 based on sensor value information collected from the first and second sensor electrodes E1, E2. In some forms of the present disclosure, the controller 210 may determine the capacitive reference value of the input device 200 based on sensor value information collected from active ones of the first sensor electrodes E1 and from the second sensor electrodes E2.

The controller 210 may deactivate some of the first sensor electrodes E1 according to a situation, and determine the capacitive reference value of the input device 200 based on sensor value information collected from active first sensor electrodes E1 and from the second sensor electrodes E2.

Specifically, the controller 210 may change any of the first sensor electrodes E1, into which noise information is brought, into an inactive state.

The controller 210 may determine any of the first sensor electrodes E1 which outputs a sensor value beyond a predetermined range for more than a first preset period of time as the sensor electrode into which the noise information is brought, and change the sensor electrode into the inactive state. The first period of time herein may be set in a range from a few seconds to tens of seconds according to the designer's intention.

Subsequently, the controller 210 may determine the capacitive reference value of the input device 200 based on the sensor value information collected from the active first sensor electrodes E1 and from the second sensor electrodes E2. Like this, the controller 210 may filter out the noise in a way of determining the capacitive reference value while leaving out the noise-based sensor value output. The input device 200 in accordance with the present disclosure may also more efficiently filter out the noise by arranging the first sensor electrodes E1 at high density in the first channel area CA1.

In the meantime, the controller 210 may keep monitoring the sensor value output from the first sensor electrode that has been changed into the inactive state, and may change the inactive first sensor electrode back into the active state if a sensor value from the inactive first sensor electrode is detected within the predetermined range.

Figure 7:
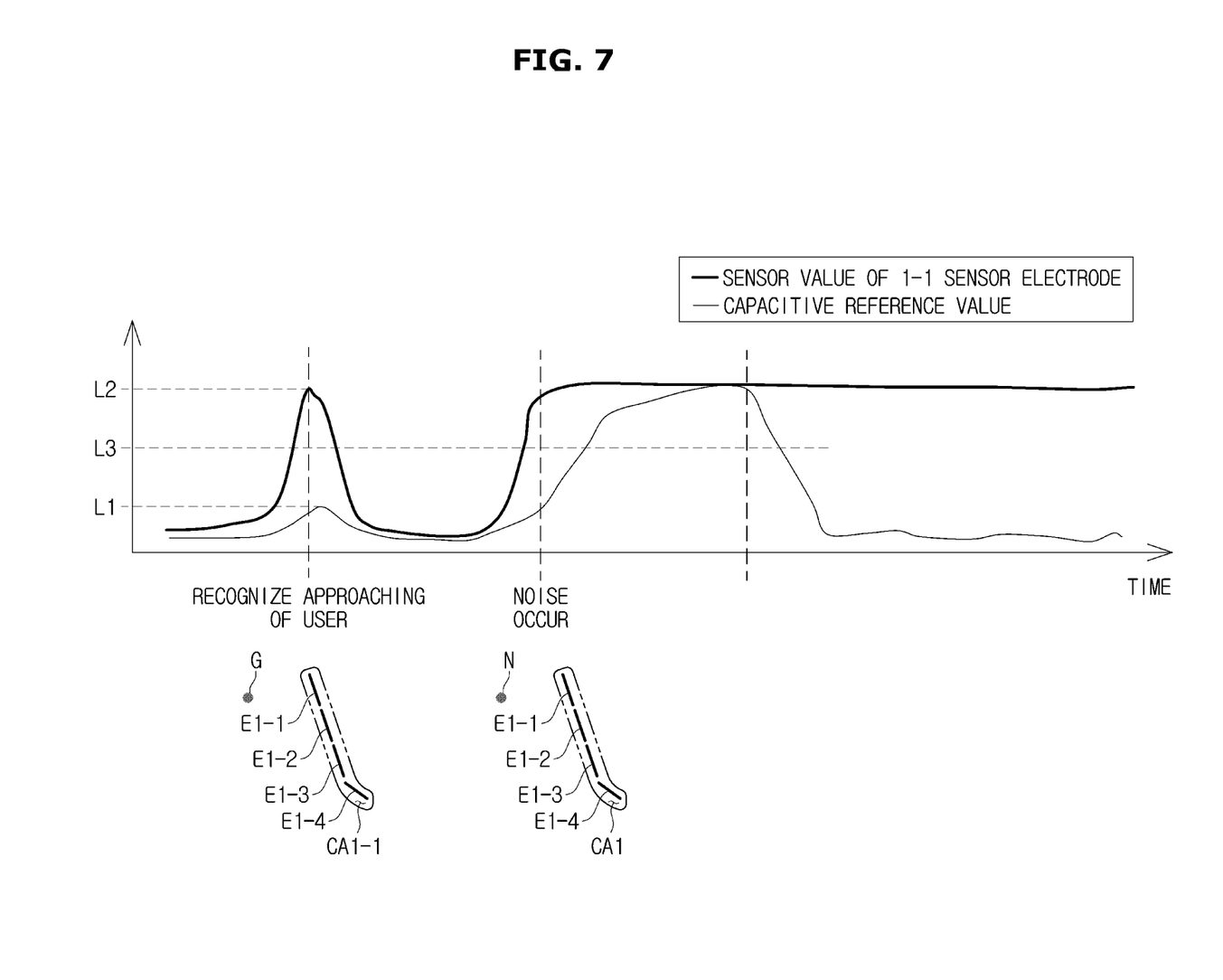
FIG. 7 is a graph for explaining a noise filtering principle of an input device.

FIG. 7 is a graph for explaining a noise filtering principle of the input device 200. In the graph of FIG. 7, the sensor value output from the 1-1 sensor electrode E1-1 and the capacitive reference value determined by the controller 210 of the input device 200 are shown on the assumption that four of the first sensor electrodes E1, e.g., E1-1, E1-2, E1-3, and E1-4 are arranged in the first channel area and that a gesture G of the user and noise N occur in the detection area of the 1-1 sensor electrode E1-1.

Referring to FIG. 7, once an approaching gesture G of the user is made in the detection area of the 1-1 sensor electrode E1-1, the sensor value output from the 1-1 sensor electrode E1-1 increases to L2 and returns to the original state.

The controller 210 may determine the capacitive reference value of the input device 200 based on sensor value information collected from the first and second sensor electrodes E1, E2, and the capacitive reference value of the input device 200 increases to L1 that is smaller than L2 and then returns to the original state.

If the noise N occurs in the detection area of the 1-1 sensor electrode E1-1, the 1-1 sensor electrode E1-1 keeps outputting a sensor value around the value of L2.

If one of the first sensor electrodes outputs sensor values beyond a predetermined range for more than the first preset period of time, the controller 210 may determine the sensor electrode that outputs the sensor value as a sensor electrode into which the noise information is brought and may change the sensor electrode into the inactive state. The predetermined range herein may be determined by the designer to be less than a value, e.g., L3, belonging to a range e.g., between L1 and L2.

If the sensor value output from the 1-1 sensor electrode E1-1 exceeds the value of L3 for more than the first preset period of time, the controller 210 may determine the 1-1 sensor electrode E1-1 as the sensor electrode into which the noise information is brought, and may change the 1-1 sensor electrode E1-1 into the inactive state.

Subsequently, the controller 210 may determine the capacitive reference value of the input device 200 based on the sensor value information collected from the active first sensor electrodes E1 and from the second sensor electrode E2. Accordingly, the capacitive reference value of the input device 200 increases nearly to the value of L2 and returns to the original state after the lapse of the first preset period of time.

The principle of filtration of the noise occurring in the detection area of the input device 200 and calculation of the capacitive reference value through arrangement of sensor electrodes of the input device 200 has thus far been described.

The first and second sensor electrodes E1, E2 of the input device 200 in accordance with the present disclosure may be arranged in many different ways rather than what is shown in FIG. 6. In the following description, to help understanding, a modified form related to the way of arrangement of the first and second sensor electrodes E1 and E2 will be examined.

Figure 8:
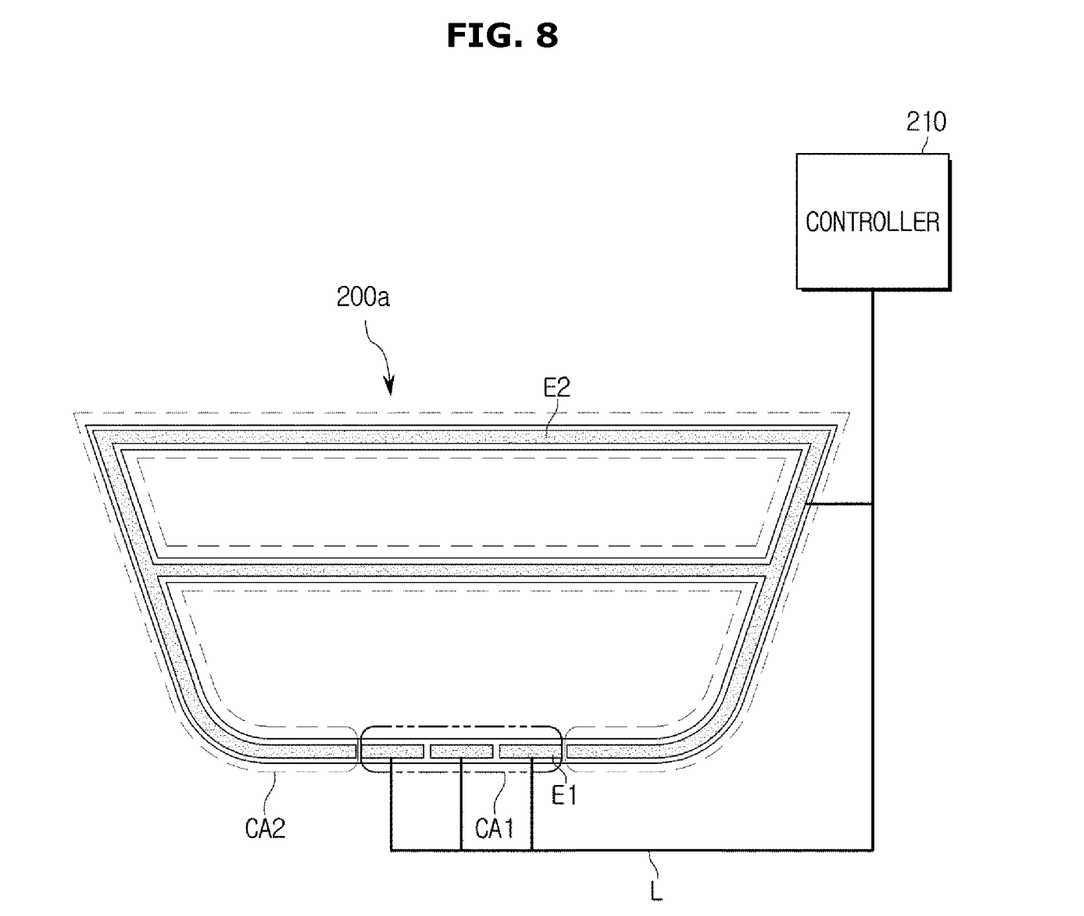
FIG. 8 shows a structure of sensor electrodes of an input device.
Figure 9:
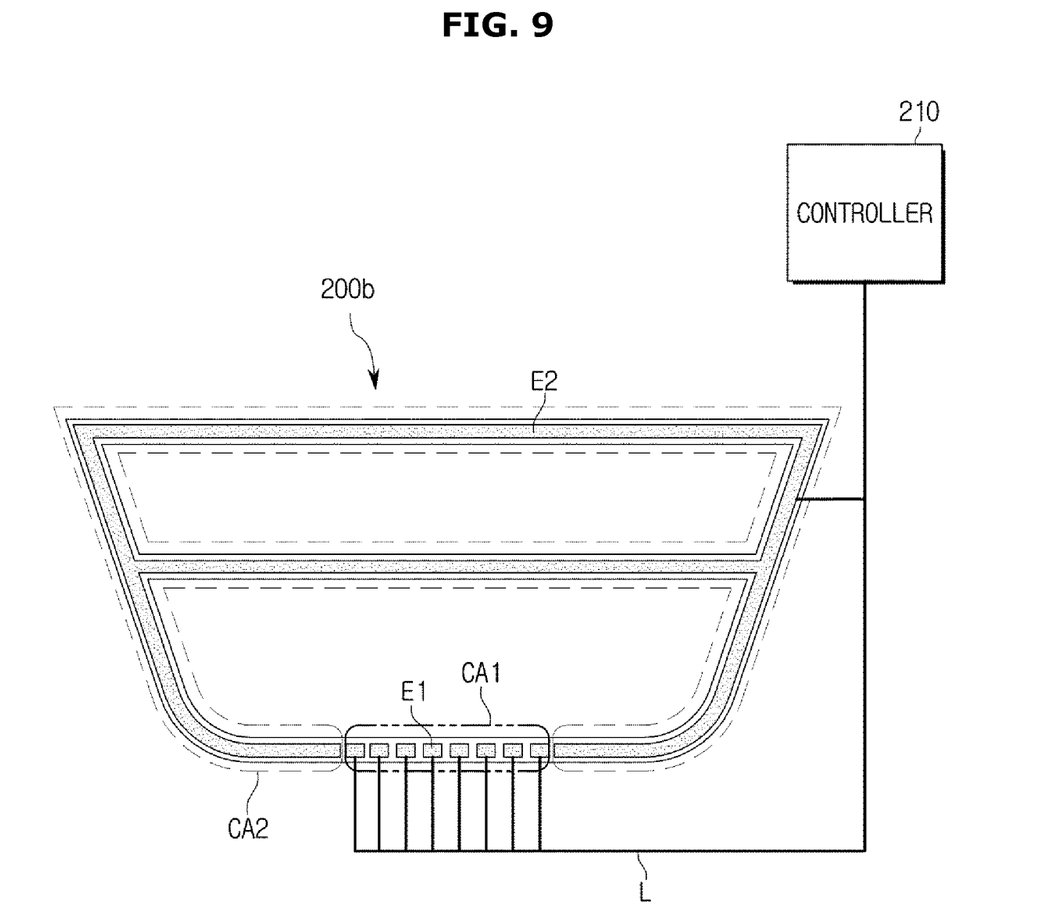
FIG. 9 shows a structure of sensor electrodes of an input device.

FIG. 8 shows a structure of sensor electrodes of an input device 200a, in some forms of the present disclosure, and FIG. 9 shows a structure of sensor electrodes of an input device 200b, in some forms of the present disclosure.

Referring to FIG. 8, the input device 200a may include a single first channel area CA1. Although an occasion when the first channel area CA1 is set up in the lower center portion of the input device 200a is illustrated in FIG. 8, the first channel area CA1 may be set up on the lower left side, right side, top side, or lower right side of the input device 200a according to the designer's intention.

Referring to FIG. 9, the input device 200b may have the first sensor electrodes E1 formed in a smaller size and arranged more densely in the first channel area CA1. As the number of the first sensor electrodes E1 increases in a unit length of the first channel area CA1, the detection sensitivity of the input device 200 may be improved by making the most of the performance of the multichannel touch IC.

For the input device 200, 200a, 200b, the density of the sensor electrodes is reflected as a design element as described above, thereby enabling the sensor electrodes to be efficiently used and minimizing an area of wrong recognition of the input device 200, 200a, 200b.

Moreover, providing a sensor value caused from noise made in a detection area of the input device 200 may be prevented in calculation of the reference value, thereby improving detection sensitivity of the input device 200 against the noise.

Structure and operating principle of the input device in some forms of the present disclosure has thus far been described. A control method of the input device in some forms of the present disclosure will now be described.

Figure 10:
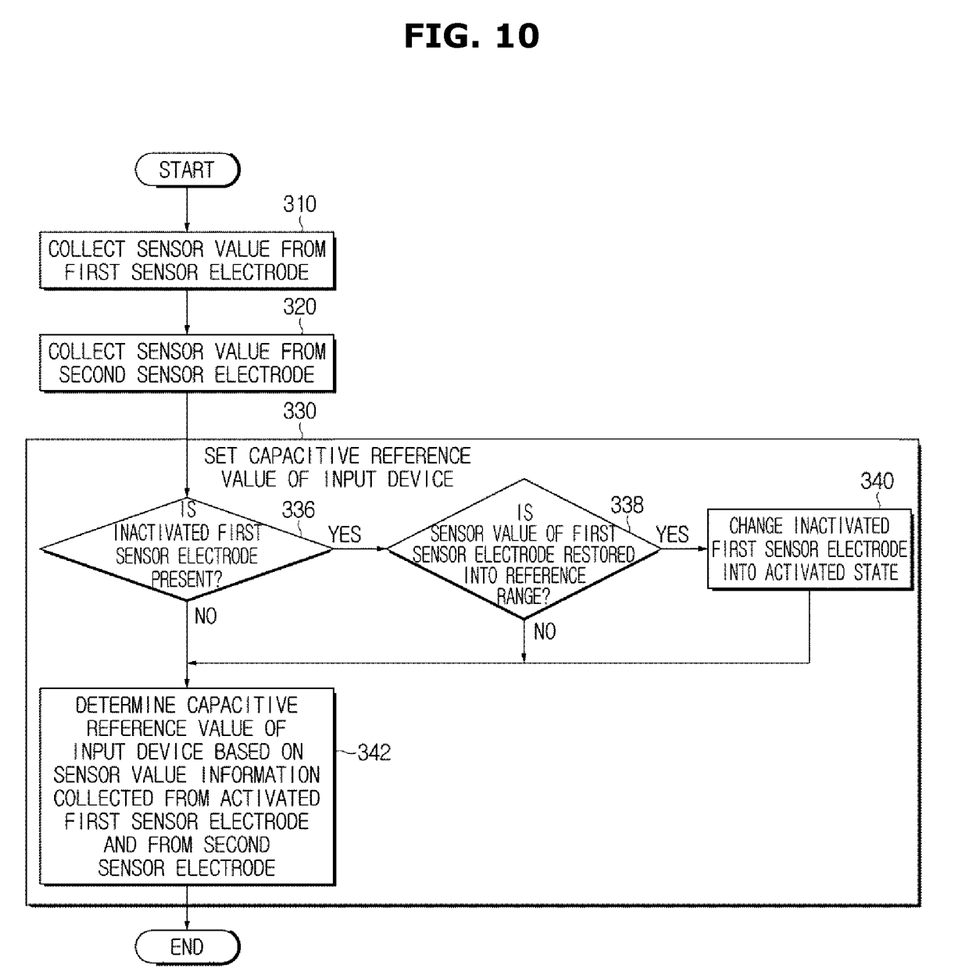
FIG. 10 is a control flowchart of an input device.
Figure 11:
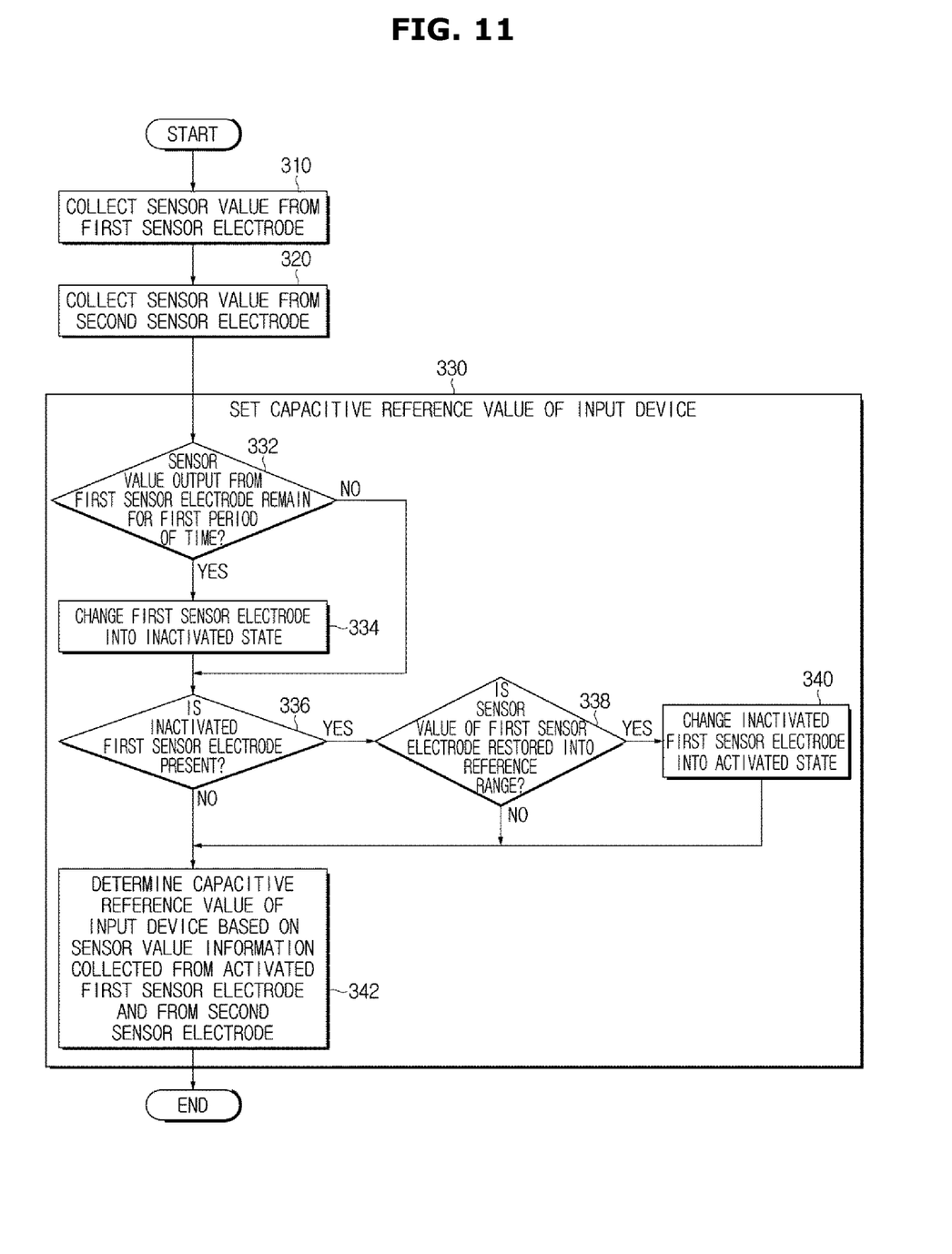
FIG. 11 is a control block diagram of an input device.

FIG. 10 is a control flowchart of the input device 200, in some forms of the present disclosure, and FIG. 11 is a control block diagram of the input device 200, in other forms of the present disclosure. To help understanding, a control procedure of the input device 200 will now be described based on the input device 200 shown in FIG. 6.

Referring to FIG. 10, a control method of the input device 200 in some forms of the present disclosure includes collecting sensor values from the first sensor electrodes E1 in 310, collecting sensor values from the second sensor electrodes E2 in 320, and determining a capacitive reference value of the input device 200 in 330.

The first sensor electrodes E1 monitor a detection area at predetermined intervals and output the collected sensor value information to the controller 210, in 310.

The second sensor electrodes E2 monitor a detection area at predetermined intervals and output the collected sensor value information to the controller 210, in 320.

The controller 210 determines the capacitive reference value of the input device 200 based on the sensor value information collected from the first and second sensor electrodes E1, E2, in 330. Determining the capacitive reference value of the input device 200 may include determining the capacitive reference value of the input device 200 based on the sensor value information collected from the active first sensor electrodes E1 and from the second sensor electrodes E2.

For this, determining the capacitive reference value of the input device 200 may include changing the first sensor electrode into the inactive state in 334, if the first sensor electrode keeps outputting a sensor value beyond a predetermined range for more than a first preset period of time in 332, as shown in FIG. 11. The controller 210 may keep monitoring the sensor value output from the first sensor electrode, and as a result, steps 332 and 334 may be performed any time when the sensor value output from the first sensor electrode E1 is detected as being out of the predetermined range for more than the first period of time. In other words, the steps 332 and 334 may be performed any time after the step 310 of collecting the sensor values from the first sensor electrodes in the process of determining the capacitive reference value of the input device 200.

Furthermore, determining the capacitive reference value of the input device 200 includes changing the inactive first sensor electrode E1 into the active state in 340, if the inactive first sensor electrode E1, if any in 336, outputs a sensor value restored into the predetermined range in 338.

Subsequently, the controller 210 determines the capacitive reference value of the input device 200 based on the sensor value information collected from the active first sensor electrodes E1 and from the second sensor electrodes E2, in 342.

On the other hand, if the sensor value output from the first sensor electrode E1 is not restored into the predetermined range, the controller 210 may determine the first sensor electrode E1 as a sensor electrode into which noise information is brought and may determine the capacitive reference value of the input device 200 based on the sensor value information collected not from the first sensor electrode E1 but from an active first sensor electrode E1 and from the second sensor electrode E2.

Furthermore, if there is no inactive first sensor electrode E1, the controller 210 determines the entire first sensor electrodes E1 as being in the active state and determines the capacitive reference value of the input device 200 based on the sensor value information collected from the first sensor electrodes E1 and from the second sensor electrodes E2 in 342.

In the present disclosure, the capacitive reference value of the input device 200 may be determined by filtering the noise occurring around the input device 200 as described above.

In some forms of the present disclosure, an input device and control method of the same is expected to gain the following effects:

First, the input device may have better detection sensitivity by making the most of the performance of a multi-channel touch IC.

Furthermore, a sensor electrode density may be reflected as a design element to efficiently use the sensor electrode without generating an area of the input device that might make wrong recognition.

Moreover, a sensor value caused from noise made in a detection area of the input device may not be used in calculation of the reference value, thereby improving detection sensitivity of the input device against the noise. Especially, as for the input device installed inside the vehicle, an expected noise is limited, so a more effective detection sensitivity effect may be attained.

Several forms have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An input device comprising:
    a plurality of first sensor electrodes arranged in a first preset channel area with a first preset density;
    a plurality of second sensor electrodes arranged in a second preset channel area with a second preset density, the second preset density being less than the first preset density; and
    a controller configured to:
        determine a capacitive reference value of the input device based on first sensor value information that is collected from the first sensor electrodes of the plurality of first sensor electrodes and the second sensor electrodes of the plurality of second sensor electrodes;
        change a subset of first sensor electrodes of the plurality of first sensor electrodes to inactive first sensor electrodes, wherein the first sensor electrodes of the subset of first sensor electrodes contain noise information;
        determine that the subset of first sensor electrodes are sensor electrodes containing the noise information, wherein first sensor electrodes of the subset of first sensor electrodes are configured to output a sensor value beyond a predetermined range for more than a first predetermined amount of time;
        determine the capacitive reference value of the input device based on second sensor value information that is collected from active first sensor electrodes of the plurality of first sensor electrodes and is collected from the second sensor electrodes of the plurality of second sensor electrodes; and
        change the inactive first sensor electrodes into the active first sensor electrodes when a sensor value of the inactive first sensor electrodes is detected within the predetermined range.

2. The input device of claim 1, wherein the input device comprises at least the first preset channel area that is formed in the input device.

3. The input device of claim 1, wherein the input device is installed on a center fascia of a vehicle.

4. A control method of an input device, the control method comprising:
    collecting a first sensor value from a plurality of first sensor electrodes;
    collecting a second sensor value from a plurality of second sensor electrodes;
    determining a capacitive reference value of the input device based on first sensor value information, wherein the first sensor value information comprises the first sensor value and the second sensor value;
    changing a subset of first sensor electrodes of the plurality of first sensor electrodes to inactive first sensor electrodes, wherein the first sensor electrodes of the subset of first sensor electrodes contain noise information; and
    determining that the subset of first sensor electrodes are sensor electrodes containing the noise information, wherein first sensor electrodes of the subset of first sensor electrodes are configured to output a sensor value beyond a predetermined range for more than a first predetermined amount of time,
    wherein the first sensor electrodes of the plurality of first sensor electrodes are arranged in a first preset channel area with a first preset density,
    wherein the second sensor electrodes of the plurality of second sensor electrodes are arranged in a second preset channel area with a second preset density and the second preset density is less than the first preset density, and
    wherein determining the capacitive reference value of the input device based on the first sensor value information comprises:
        determining the capacitive reference value of the input device based on second sensor value information that is collected from active first sensor electrodes of the plurality of first sensor electrodes and is collected from the second sensor electrodes of the plurality of second sensor electrodes, wherein the first preset channel area comprises the plurality of first sensor electrodes; and
when a sensor value of the inactive first sensor electrodes is detected within the predetermined range, chancing the inactive first sensor electrodes to the active first sensor electrodes.

\* \* \* \* \*